United States Patent [19]

Farago et al.

[11] Patent Number: 4,458,388
[45] Date of Patent: Jul. 10, 1984

[54] TENSILE TAPE AND CLAMP THEREFOR

[75] Inventors: Alan D. Farago, Providence, R.I.;
Stephen T. O'Meara, Sutton, Mass.;
David M. Randall, West Warwick,
R.I.

[73] Assignee: Neptco Incorporated, Pawtucket, R.I.

[21] Appl. No.: 495,651

[22] Filed: May 18, 1983

Related U.S. Application Data

[62] Division of Ser. No. 340,378, Jan. 18, 1982.

[51] Int. Cl.³ .............................................. F16G 11/06
[52] U.S. Cl. ............................... 24/115 R; 24/68 CD;
24/127; 24/135 R; 24/302
[58] Field of Search ............ 24/115 R, 115 H, 115 K,
24/115 L, 135 R, 135 N, 135 L, 131 C, 127,
122.6, 30, 302, 68 R, 68 CD, 68 C, 68 CT;
428/294

[56] References Cited

U.S. PATENT DOCUMENTS

| 299,199 | 5/1884 | Brown | 24/135 R |
| 2,356,908 | 8/1944 | Arrowsmith | 24/129 R |
| 3,073,734 | 1/1963 | Bemmels | 428/294 |
| 3,448,958 | 6/1969 | Virkki | 24/115 K |
| 4,162,561 | 7/1979 | Tillemans | 24/115 R |

*Primary Examiner*—Victor N. Sakran
*Attorney, Agent, or Firm*—Salter & Michaelson

[57] ABSTRACT

A high-strength fibrous tape and clamping device therefor to effect the termination and/or splicing thereof. The device comprises a cylindrical body portion and a pair of semicircular plug halves which are retained proximal to the body portion and which cooperate to securely grip the tape in a gradual arcuate path without the use of excessive clamping pressures that would normally cause substantial reductions in the tape's tensile strength. The plug halves have opposed generally flat mating surfaces and oppositely disposed convex arcuate surfaces. The halves are retained proximal to the body portion with the mating surfaces thereof in generally aligned relation by means of spaced bolts which extend generally perpendicularly through the mating surfaces into the body portion. The terminal portion of a tape or the like, which preferably has a plastic antifriction coating thereon, is interposed between the mating surfaces, and the tape is then wrapped around the exterior of the outer convex arcuate surfaces, and then extends away from the body portion. Tensile stresses along the tape draw the two halves into clamping engagement with the end portion of the tape located between the two halves, and this, in combination with the pressurized engagement of the tape with the arcuate surfaces, results in secure gripping of the tape without crushing of the fibers.

12 Claims, 12 Drawing Figures

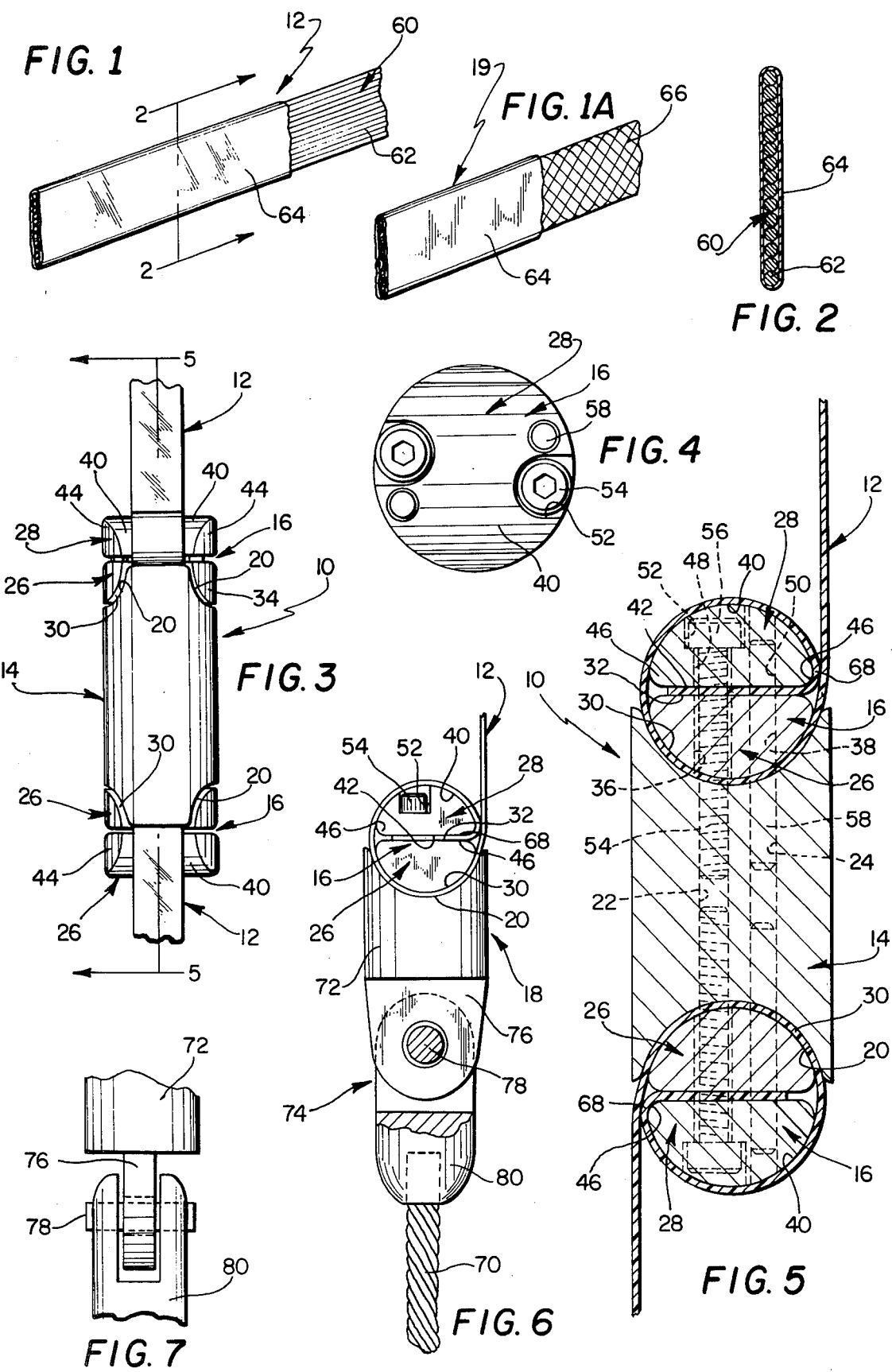

TENSILE TAPE AND CLAMP THEREFOR

This is a division of application Ser. No. 340,378 filed Jan. 18, 1982.

BACKGROUND AND SUMMARY OF THE INVENTION

The instant invention relates generally to the installation of cables and the like in elongated ducts and conduits, usually underground, and more particularly to a novel tensile tape and clamping device therefor for facilitating such installations.

The present conventional procedure for installing cables and the like in elongated conduits, particularly underground conduits, comprises a multistep method wherein several preliminary lines of gradually increased size and strength are successively pulled through the conduit before the final cable can be installed. First a measuring tape is attached to an air plug and the plug and the tape are blown through the conduit using a compressed air stream. After the length of the conduit has been determined with the measuring tape, and with the tape still in the conduit, a lightweight rope is attached to an end of the tape and is pulled through the conduit. After the rope has been pulled through the conduit, the rope is used to pull a winch line through the conduit in a similar manner and the winch line in turn is used to pull the desired cable through the conduit. These sequential steps are necessary because the measuring tape and rope do not per se possess sufficient tensile strength to pull the heavy cable through the conduit.

Obviously, substantial savings of time and expense could be realized by the elimination of one or more of the above steps from cable installation operations. In particular, it is obvious that by using a measuring tape having a sufficiently high tensile strength, it is possible to use the tape to pull the winch line through the conduit and in some cases, to pull the cable itself through, and thereby eliminate the use of the lightweight rope and the winch line as well. In order to do this, it is essential that the measuring tape have a high tensile strength. However, in order to "blow" the measuring tape through the conduit, the tape must be of comparatively lightweight and must be capable of passing through the conduit with only minimal frictional resistance. Therefore, it is obvious that such a simplified method is only possible using specially coated tapes having extremely high strength-to-weight ratios.

While several types of high strength synthetic fiber tapes have been heretofore available, including tapes comprising KEVLAR (Dupont TM), E-glass and graphite fibers, they have not heretofore been effectively usable in measuring and pull tape applications for a number of reasons. First of all, the known tapes of this type have a tendancy to rub or abrade against the inner surfaces of conduits creating excessive frictional tension, thus making it difficult both to effectively "blow" the tapes through the conduits as aforedescribed, and also to pull them therethrough in subsequent operations. In addition, while these high-strength fibrous tapes have sufficiently high tensile strengths for this type of application, the fibers in these tapes are extremely frangible and hence have a tendency to fracture if clamped too tightly or if bent sharply, knotted etc. In fact, it has been found that excess clamping or bending of such tapes results in reductions of as much as 60 percent or more in the tensile strengths of the tapes, causing the tapes to fail in their specified functions. As a result, while lightweight tapes of adequate tensile strengths to pull winch lines or lightweight cables through conduits have heretofore been available, the use thereof in this manner has been limited by the unavailability of effective clamping devices for effecting a connection to an end of the tape.

As above stated, a further disadvantage of the heretofore available high-strength, lightweight tapes in cable installation applications has been the excessive frictional resistance created when the tapes rub or abrade against the inner surfaces of conduits. This has limited the effectiveness of the above described air blowing techniques in conduits, particularly in those of substantial lengths, as well as the subsequent pulling operations.

The instant invention overcomes these and other disadvantages by providing a fibrous tape of the type hereinabove described having an antifriction, flexible plastic casing thereon which substantially reduces the resistance created by frictional contact with the inner conduit surfaces, and by providing an effective device for clamping the tape which doesn't cause substantial damage to the fibers therein, so that the tape retains substantially all of its tensile strength. The clamping device of the instant invention is effective for securely clamping fibrous tapes and the like without causing sharp or severe bends therein so that tension is evenly distributed along the tape as it passes through the device without applying damaging crushing forces to the fibers.

In particular, the device of the instant invention comprises an elongated preferably cylindrical body portion preferably having a concave arcuate surface on an end thereof, a first plug half having a first convex arcuate surface thereon which is complimentary to the concave body portion arcuate surface and a first mating surface which is oppositely directed from the first convex arcuate surface, and a second plug half having a second mating surface thereon which is directed toward the first mating surface, and a second convex arcuate surface which is oppositely directed from the second mating surface. Means are provided which laterally retain the first and second mating surfaces in generally mated alignment and simultaneously retain the second plug half proximal to the body portion with the first plug half interposed therebetween and with the first plug half and the body portion arcuate surfaces in generally complimentary relation. A stranded fibrous tensile tape or the like is clamped in the device by positioning the terminal portion of the tape between the opposed mating surfaces of the halves and extending the adjacent portion of the tape along the outer arcuate surface of the second plug half, between the complimentary body portion and second plug half arcuate surfaces and generally away from the body portion in a direction which is generally perpendicular to the opposed mating surfaces. Tensile stresses applied along the tape cause the two plug halves, particularly the mating surfaces thereof, to be urged or drawn together which causes clamping pressure to be applied to the tape between the mating surfaces and also causes pressurized engagement of the tape with the arcuate surfaces of the two plug halves. In one embodiment of the invention, the tape is further retained in the device through the application of even clamping pressures between the complimentary plug and body portion arcuate surfaces. In any case, however, the tape is retained in positive engagement with the various surfaces of the plug halves. By extending the tape along gradual arcuate surfaces, the clamping of the tape is effected without sharp bending thereof and without the application of sharp localized pressure thereto so that damage to the fibers in the tape is avoided. Consequently, the tape retains substantially all of its tensile strength when clamped in the device of the instant invention.

Accordingly, it is an object of the instant invention to provide a device for facilitating the installation of elongated cables and the like in conduits.

Another object of the instant invention is to provide a device for clamping synthetic fibrous tape without causing substantial weakening thereof.

Another object of the instant invention is to provide an effective antifriction fibrous tape for the installation of cables and the like in conduits.

Other objects, features and advantages of the invention shall become apparent as the description thereof proceeds when considered in connection with the accompanying illustrative drawings.

DESCRIPTION OF THE DRAWINGS

In the drawings which illustrate the best mode presently contemplated for carrying out the present invention:

FIG. 1 is a perspective view of a tensile tape constructed in accordance with the instant invention and having longitudinal fibrous strands;

FIG. 1A is a perspective view of a similar tensile tape having braided synthetic fibers;

FIG. 2 is a sectional view taken along line 2—2 in FIG. 1;

FIG. 3 is a front elevational view of the clamping device of the instant invention embodied as a splicing device for splicing a pair of tensile tapes together;

FIG. 4 is an enlarged top plan view of the device;

FIG. 5 is an enlarged sectional view taken along line 5—5 in FIG. 3;

FIG. 6 is a side elevational view of an alternate embodiment of the clamping device;

FIG. 7 is a fragmentary front elevational view of the lower end portion of the device of FIG. 6.

DESCRIPTION OF THE INVENTION

Figure 8:
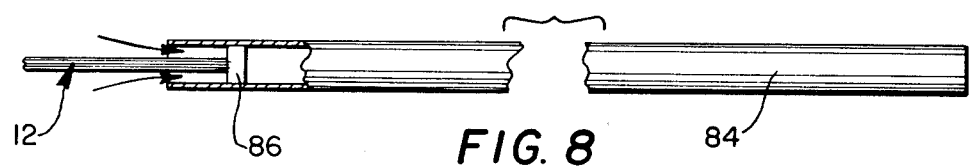
FIGS. 8 through 11 are elevational views partly in section, illustrating sequentially the method of installing a cable in a conduit utilizing the clamping device and tensile tape of the instant invention.
Figure 9:
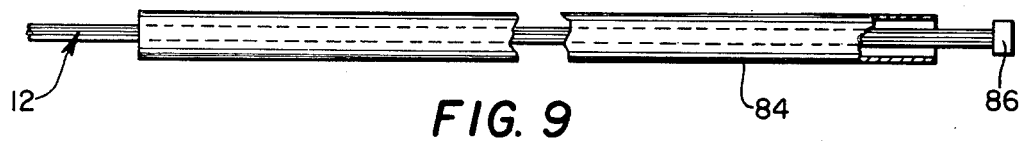
Figure 10:
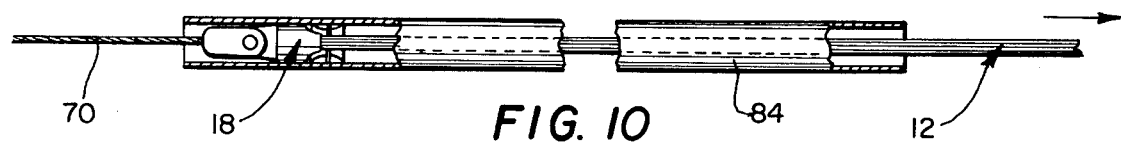
Figure 11:
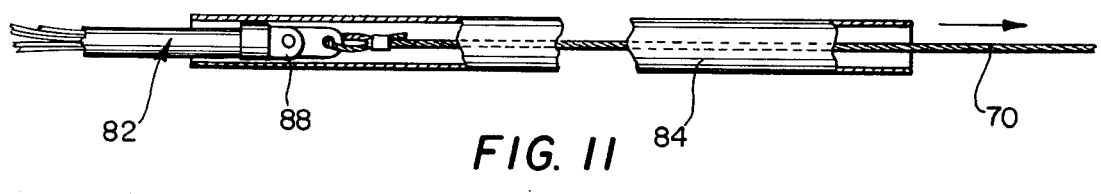

Referring now to the drawings, the clamping device of the instant invention is generally indicated at 10 in FIGS. 3 through 5. In the embodiment of FIGS. 3 through 5, the device 10 comprises a splicing device used for connecting a pair of tensile tapes of the type generally indicated at 12 in FIG. 1. In this regard the device 10 generally comprises a cylindrical elongated body portion 14, preferably of metallic construction, with a pair of split plugs 16, also preferably metal, secured to opposite ends thereof in mated relation for clamping the tape 12. It is understood, however, that in other embodiments, such as the one generally indicated at 18 in FIG. 6, the clamping device of the instant invention may be used to secure the end of a single tape 12 and that either of the devices 10 or 18 may be used to secure tapes of other types, such as the braided tape generally indicated at 19 in FIG. 1A.

The body portion 14 generally comprises an elongated cylindrical member having concave arcuate surfaces 20 on the ends thereof. The surfaces 20 of the body portion 14, as illustrated, comprise circular arcuate surfaces although other gentle curvatures could be used. Longitudinal threaded openings 22 and bores 24 extend through the body portion 14 adjacent opposite sides thereof, each opening 22 and bore 24 being spaced from its opposite opening and bore by a distance greater than the width of the tapes 12 or 19. The split plugs 16 comprise first and second plug halves 26 and 28, respectively, which, as may be seen from FIGS. 5 and 6, are of substantially semicircular cross section. The first halves 26 are defined by first convex arcuate surfaces 30, substantially flat transverse inner mating surfaces 32, and rounded ends 34. The first arcuate surfaces 30 are complimentary to the surfaces 20, being disposed in slightly spaced relation therewith, to provide uniform spacing therebetween for receiving the tapes 12. In this connection, in the preferred embodiment, the differences between the radii of the surfaces 20 and 30 are substantially equal to the thicknesses of the tape 12 to permit the application of uniform clamping forces along the tapes 12. Bores 36 and 38 extend through the first halves 26 communicating with the openings 22 and the bores 24, respectively. The second halves 28 are of substantially the same configurations as the first halves 26, having second convex arcuate surfaces 40 which are oppositely disposed from the surfaces 30, second inner mating surfaces 42 which are disposed in generally aligned relation with the surfaces 32, and rounded ends 44. Rounded corners 46 are formed between the surfaces 40 and 42, and bores 48 and 50 aligned with the bores 36 and 38, respectively, extend through the halves 28 with the bores 48 having enlarged outer recesses 52. When the halves 26 and 28 are in assembled relation with the body portion 14, as illustrated in FIG. 3, the ends 34 and 44 conform to the general cylindrical configuration of the body portion 14.

Retaining the halves 28 proximal to the body portion 14 with the respective halves 26 interposed therebetween are allen socket machine screws 54 which extend freely through the aligned bores 48 and 36 and are received in threaded engagement in the openings 22 with heads 56 of the screws 54 positioned in the recesses 52. Hardened dowel pins 58 extend through the openings 50, 38 and 24 to relieve sheer stresses on the screws 56 and further prevent rotation of the plugs 16. In this manner, the surfaces 32 and 42 are laterally retained in mated relation whether or not the screws 54 are in their inner or tightened positions.

Each of the tapes 12 comprises an elongated band 60 which may comprise longitudinally extending strands 62 of KEVLAR fibers (Dupont TM) and which is encased in a clear flexible plastic antifriction casing 64 of polyester or the like. It is understood, however, that other high modulous reinforcing fibrous materials may be used for the bands 60, such as graphite, E-glass and other carbon fibers, and that other fiber patterns such as the one illustrated in the braided band 66 in the tape 19 in FIG. 1A are possible.

The tapes 12 are clamped in the device 10 without subjecting them to substantial crushing forces and without causing sharp bends therein. In this connection it is seen in FIG. 5 that the tapes 12 extend between the arcuate surfaces 20 and 30 and extend along arcuate paths between the screws 54 and pins 58, around the surfaces 40 and then between the surfaces 34 and 42.

When the tapes 12 are so positioned in the device 10, tensile stresses applied thereto directed away from the respective ends of the body portion 14 cause the halves 26 and 28, and more particularly, the surfaces 32 and 42, to be urged or drawn together which causes clamping pressure to be applied to the terminal portions of the tape 12 by the surfaces 32 and 42. The tensile stresses also cause further pressurized frictional engagement of the tapes 12 with the halves 26 and 28 as the tapes 12 extend along smooth arcuate paths on the surfaces 40 and 30. As a result of a combination of these effects, the tapes 12 are positively retained in the device 10. To further assure positive clamping of tapes 12, the screws 54 may be tightened to cause slightly pressurized clamping of the tapes 12 between the surfaces 20 and 30 and further pressurized engagement thereof between the surfaces 32 and 42. It should be noted, however, that the application of excessive clamping forces with the screws 54 in this manner is unnecessary and should be avoided to prevent the crushing of the fibers in the tapes 12. In any event, when the tapes 12 are clamped in the device 10, either with or without the application of additional clamping forces by means of the screws 54, the tapes 12 are securely retained in smooth arcuate paths whereby undesirable sharp bending of the tapes 12 is avoided. In this regard it is preferable that the radii of the surfaces 30 and 40 be at least 20 times the diameter of strand 62 to prevent the fracturing thereof.

Further referring to FIG. 5, it is seen that although substantial sharp bending of the tapes 12 is avoided for the most part in the device 10, bends 68 are formed in the tapes 12 where they enter between the surfaces 32 and 42 from the surfaces 40 around the rounded corners 46. While this may result in some weakening of the tapes 12 at the bends 68, the effectiveness of the device 10 results from the clamping of the tapes 12 between the surfaces 32 and 42 in combination with the even frictional contact of the tapes 12 with the surfaces 40, 30 and 20. Therefore, as a result of the frictional contact of the tapes 12 with the surfaces 30 and 40 as well as with the surfaces 20 in the preferred embodiment, the tensile stresses on the tapes 12 are substantially less in the areas of the bends 68 than they are in the unclamped portions of the tapes 12 and consequently some weakening of the tapes 12 in these areas is inconsequential.

An alternate embodiment of the instant invention is generally indicated at 18 in FIG. 6. The device 18 comprises a clamping device for connecting the tape 12 to a winch cable 70. The device 18 includes a body portion 72 and a single split plug 16 identical to that aforedescribed. The opposite extremity of the device 18 comprises a conventional cable coupling 74 having an eye member 76 which is pivotally attached by means of a pin 78 to a cable end 80 to which the cable 70 is attached.

The use of the device 18 to install a composite cable 82 in a conduit 84 is illustrated in FIGS. 8 through 11. As is seen in FIG. 8, a measuring tape 12 is first secured to an air plug 86 and compressed air is blown into the conduit 84 to move the air plug 86 and tape therethrough. The tape 12 is then secured in the device 18 and is used to pull the cable 70 through the conduit 84. While heretofore it was only possible to pull a lightweight rope through the conduit 84 with the tape 12, the device 18 clamps the tape 12 without substantially reducing the tensile strength thereof and therefore permits the use of the tape 12 to pull the winch cable 70 through the conduit 84 to thereby eliminate an entire step in the installation of the composite cable 82 in the conduit 84. After the cable 70 has been pulled through the conduit 84, it is attached to a coupling 88 on the end of the composite cable 82 and the composite cable 82 is pulled through the conduit 84. In some cases, it may even be possible to connect the cable 82 directly to the measuring tape 12 and use the latter to pull the cable through the conduit thereby eliminating two steps in the installation procedure.

It is seen therefore that the devices 10 and 18 of the instant invention and the tapes 12 and 19 used in combination therewith provide substantial advancements in the art of cable installations. The clamping device of this invention provides an effective means for terminating or connecting fibrous tapes without substantial reductions in the tensile strengths thereof, and specifically, it has been found that less than 15 percent of the tensile strength of the tape is lost where the present invention is used. This permits substantially expanded use of the tapes in cable installations as well as in many other applications. Also, covering the tape with an antifriction casing has proven to be extremely beneficial when the tape is "blown" through an underground conduit and when the tape is thereafter pulled out of the conduit. Further, due to the substantial reductions in both time and expense in cable installations resulting from the use of the devices 10 and 18, the instant invention is of substantial commercial significance.

While there is shown and described herein certain specific structure embodying this invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A device for clamping stranded fibrous tape and the like comprising:
  a. a body portion;
  b. a first plug half having a first mating surface thereon and a first convex arcuate surface which is oppositely directed from said first mating surface;
  c. a second plug half having a second mating surface thereon which is directed toward said first mating surface and a second convex arcuate surface which is oppositely directed from said second mating surface; and
  d. means for laterally retaining said first and second mating surfaces in generally mated alignment and for retaining said second plug half proximal to said body portion with said first plug half interposed therebetween, whereby when a tape is disposed with the terminal portion thereof between said mating surfaces and with the portion adjacent the terminal portion thereof extending around said second and first arcuate surfaces, tensile stresses on the tape directed generally away from the body portion cause pressurized clamping of said terminal portion between said mating surfaces and pressurized engagement of said adjacent portion with said first and second arcuate surfaces.

2. In the device of claim 1, said first and second plug halves having spaced pairs of aligned openings therethrough, said body portion having a spaced pair of threaded openings therein which are aligned with the openings in said halves, said retaining means comprising threaded bolt means which extend freely through said aligned plug half openings and into threaded engagement with said threaded openings.

3. In the device of claim 1, said body portion having a concave arcuate surface thereon which is complimentary to said first convex arcuate surface and in slightly spaced relation therewith.

4. In the device of claim 3, said first and second mating surfaces being generally flat.

5. In the device of claim 2, said body portion having a concave arcuate surface thereon which is complimentary to said first convex arcuate surface and in slightly spaced relation therewith, said bolt means being adjustable to adjust the spacing between said first convex arcuate surface and said concave arcuate surface whereby clamping pressure may be exerted on said adjacent tape portion as it passes therebetween and on said terminal portion between said mating surfaces.

6. In the device of claim 1, said plug half arcuate surfaces being generally semicircular.

7. In the device of claim 3, said plug half and body portion arcuate surfaces being generally semicircular.

8. The device of claims 6 or 7 in combination with an integrated stranded fibrous tape, the radii of said semicircular surfaces being at least twenty times the diameter of the tape strands.

9. The combination of claim 8, further characterized in that said tape comprises integrated longitudinally extending strands, said tape further comprising an outer antifriction plastic casing.

10. The combination of claim 8, further characterized in that said tape comprises integrated braided strands, said tape further comprising an outer antifriction plastic casing.

11. The device of claim 1, further comprising means for connecting said body portion to an elongated cable or the like.

12. The device of claim 1, further characterized as a device for securing a pair of stranded fibrous tapes together, said body portion being of elongated configuration, said device comprising a pair of first and second plug halves on opposite ends of said body portion and comprising said retaining means at both ends of said device whereby said pair of tapes are retainable at opposite ends of said device.

* * * * *